United States Patent [19]

Roscoe et al.

[11] Patent Number: 5,521,378
[45] Date of Patent: May 28, 1996

[54] METHOD AND APPARATUS FOR GAMMA RAY LOGGING OF UNDERGROUND FORMATIONS

[75] Inventors: Bradley A. Roscoe; James A. Grau, both of Ridgefield, Conn.; Christian Stoller, Kingwood, Tex.

[73] Assignee: Schlumberger Technology Corporation, Ridgefield, Conn.

[21] Appl. No.: 382,458

[22] Filed: Feb. 1, 1995

[51] Int. Cl.$^6$ .................................................. G01V 5/10
[52] U.S. Cl. ................. 250/269.6; 250/266; 250/269.7
[58] Field of Search .............................. 250/269.6, 262, 250/264, 265, 266, 269.7

[56] References Cited

U.S. PATENT DOCUMENTS

| | | | |
|---|---|---|---|
| 4,390,783 | 6/1983 | Grau | 250/270 |
| 4,430,567 | 2/1984 | Oliver et al. | 250/270 |
| 4,464,569 | 8/1984 | Flaum | 250/270 |
| 4,480,186 | 10/1984 | Wolk | 250/268 |
| 4,507,554 | 3/1985 | Hertzog et al. | 250/270 |
| 4,587,424 | 5/1986 | Grau | 250/262 |
| 4,760,252 | 7/1988 | Albats et al. | 250/269 |
| 4,883,956 | 11/1989 | Melcher et al. | 250/269 |
| 5,097,123 | 3/1992 | Grau et al. | 250/270 |
| 5,237,594 | 8/1993 | Carroll | 376/160 |

OTHER PUBLICATIONS

Hearst, J. R. et al., "A Comparison of Energy–Window and Spectral–Fitting Methods for the Estimation of Carbonate Content in Rocks Using Neutron–Induced Gamma Rays", *The Log Analyst*, (Nov.–Dec. 1993), pp. 11–19.
D. V. Ellis, "Pulsed Neutron Spectroscopy", *Well Logging for Earth Scientists*, Elsevier (1987), pp. 293–301.

*Primary Examiner*—Carolyn E. Fields
*Attorney, Agent, or Firm*—Leonard W. Pojunas; Martin Hyden

[57] ABSTRACT

A method for determining the porosity of an underground formation includes the steps of irradiating the formation with neutrons, detecting and measuring gamma rays resulting from irradiation of the formation, discriminating between gamma rays from the formation and gamma rays from the tool, and using a measurement of the gamma rays from the tool to determine the formation porosity. A suitable logging tool includes a neutron source, a gamma ray detector, means for discriminating between gamma rays from the formation and gamma rays from the tool, and means for relating the gamma rays from the tool to the formation porosity.

18 Claims, 3 Drawing Sheets

METHOD AND APPARATUS FOR GAMMA RAY LOGGING OF UNDERGROUND FORMATIONS

FIELD OF THE INVENTION

The present invention relates to a method and apparatus for logging of underground formations using gamma rays. In particular, the invention provides a method by which the response of a gamma ray detector in a borehole tool can be analyzed to give an indication of formation porosity.

BACKGROUND OF THE INVENTION

It has been recognized for some time that detection and measurement of gamma rays in a borehole can be used to characterize the underground formation through which the borehole passes. Measurement of naturally ocurring gamma rays can provide some information but it has been found that more extensive information can be obtained by irradiating the formation with high energy neutrons. The neutrons interact with formation nuclei to cause gamma ray production by way of inelastic neutron scattering and neutron capture (neutron absorption). In inelastic neutron scattering, the neutron bounces off the nucleus but excites it into quickly giving off what are called inelastic gamma rays. The measurement of gamma ray energies from inelastic neutron scattering can be used to yield the relative concentrations of carbon and oxygen (C/O logging) which can be used to determine the water saturation of the formation. In neutron absorption, the nucleus absorbs the neutron and becomes excited, typically accompanied by emission of capture gamma rays. Neutron absoption, or neutron capture is most common after a neutron has been slowed by elastic and inelastic interactions to thermal energies of about 0.025 eV. The measurement of capture gamma ray energies can be used to estimate the abundances of certain elements in the formation, typically silicon, calcium, chlorine, hydrogen, sulfur, iron, titanium and gadolinium. Examples of tools and methods for gamma ray logging are shown in U.S. Pat. Nos. 4,390,783, 4,430,567, 4,464,569, 4,507,554, 4,883,956, 5,097,123 and 5,237,594.

Tools for gamma ray logging comprise a source of neutrons, typically a pulsed accelerator source such as a D–T source producing neutrons having an energy of about 14 MeV, and a gamma ray detector such as a scintillator and photomultiplier tube combination. The scintillator is generally a crystal such as thallium-doped sodium iodide although other scintillators such as bismuth germanate, cerium-doped gadolinium oxyorthosilicate or cerium-doped lutetium oxyorthosilicate might also be used.

The determination of formation porosity can also be performed by irradiating the formation with neutrons and making measurements in the borehole. However, in this case it is normal to detect the neutron returning to the borehole after interaction with formation nuclei by means of a neutron detector such as a $^3$He proportional counter. The neutron source for porosity determination can be the same as that used for gamma ray logging. Examples of tools and methods for porosity determination by neutron logging are given in U.S. Pat. No. 4,760,252.

The effect of neutrons interacting with the elements contained in the tool itself has been observed in C/O logging tools, see for example The Log Analyst, November–December 1993, pp 11–19. It was observed that the magnitude of the tool contribution was dependent on the gap between the tool and the borehole wall and on the presence of water. This background has been found to be variable and has caused problems in interpreting measurements made with gamma ray detectors in boreholes.

It is an object of the invention to provide a method of using the tool contribution to determine the porosity of the formation under investigation.

SUMMARY OF THE INVENTION

One aspect of the present invention provides a method for determining the porosity of an underground formation comprising irradiating the formation with neutrons, detecting and measuring gamma rays resulting from irradiation of the formation, discriminating between gamma rays from the formation and gamma rays from the tool, and using a measurement of the gamma rays from the tool to determine the formation porosity.

A further aspect of the invention comprises a logging tool including a neutron source, a gamma ray detector, means for discriminating between gamma rays from the formation and gamma rays from the tool, and means for relating the gamma rays from the tool to the formation porosity.

The present invention resides in the discovery that the gamma rays from the tool are highly dependent on the porosity of the formation. This is because the tool gamma rays are the result of fast and epithermal neutrons interacting with the tool material by way of inelastic scattering. Shielding in the tool allows only a small and substantially constant neutron flux through the tool between the source and the detector and so the principal way that neutrons pass from the source to the detector is via the formation and the amount of epithermal and high energy neutrons returning to the detector is dependent on porosity. Consequently, by discriminating between formation gamma rays and tool gamma rays, it is possible to determine formation porosity.

It is preferred that the detector be shielded with a material such as boron which absorbs thermal neutrons to reduce the effect of capture gamma rays from the tool further confusing the measurement. It may also be desirable to further shield the detector with a material such as tungsten which has high inelastic gamma ray production so magnifying the effect of the high energy neutrons returning to the tool.

DESCRIPTION OF THE PREFERRED EMBODIMENT

Figure 1:
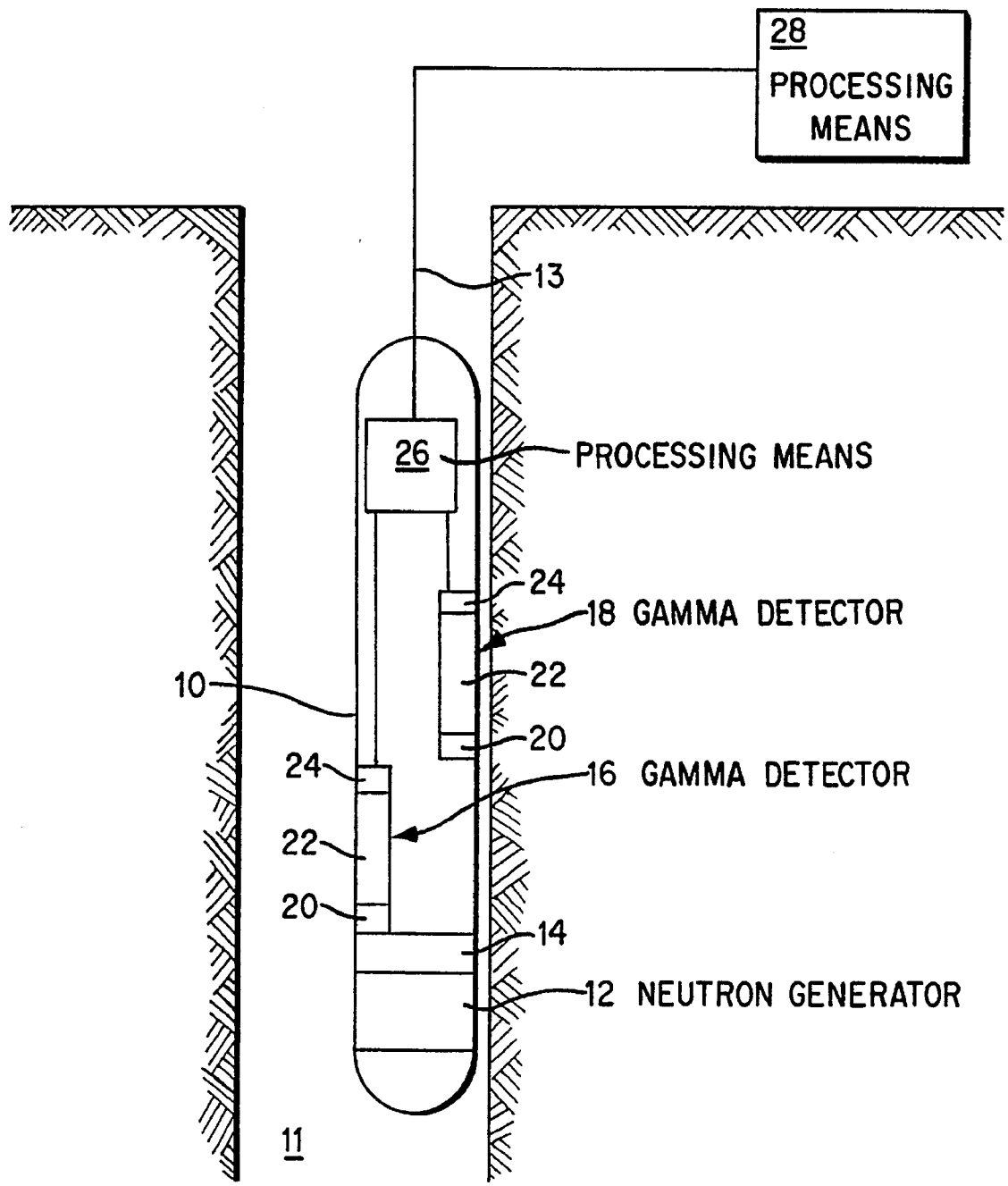
FIG. 1 shows a borehole logging tool for measuring gamma ray spectra.

FIG. 1 shows a schematic view of the Schlumberger RST borehole logging tool. This tool comprises a tool body 10 which can be lowered into a well 11 by means of a wireline cable 13 and logged in the conventional manner. Located in the tool body 10 are a pulsed neutron generator 12, shielding 14 and near and far gamma ray detectors 16, 18. Each of the gamma ray detectors 16, 18 comprise a scintillator crystal 20, a photomultiplier tube 22 and associated electronics 24 connected to data communication and processing means 26, 28 in the tool and/or at the surface. The detectors 16, 18 are shielded and offset from the tool axis such that in use, the sensitivity of the near detector 16 to gamma rays from the borehole is increased and the sensitivity of the far detector 18 to gamma rays from the formation is increased. The neutron generator 12 and the detectors 16, 18 are substantially as described in U.S. Pat. No. 4,883,956 (incorporated herein by reference). This tool can be logged through the borehole to measure C/O ratio or elemental yields from the formation. Other tools utilizing neutron induced gamma ray C/O or elemental yield measurements can also be used in the performance of the present invention. The apparatus and methods described in U.S. Pat. No. 5,440,118 (incorporated herein by reference) can be used when performing the present invention.

Figure 2:
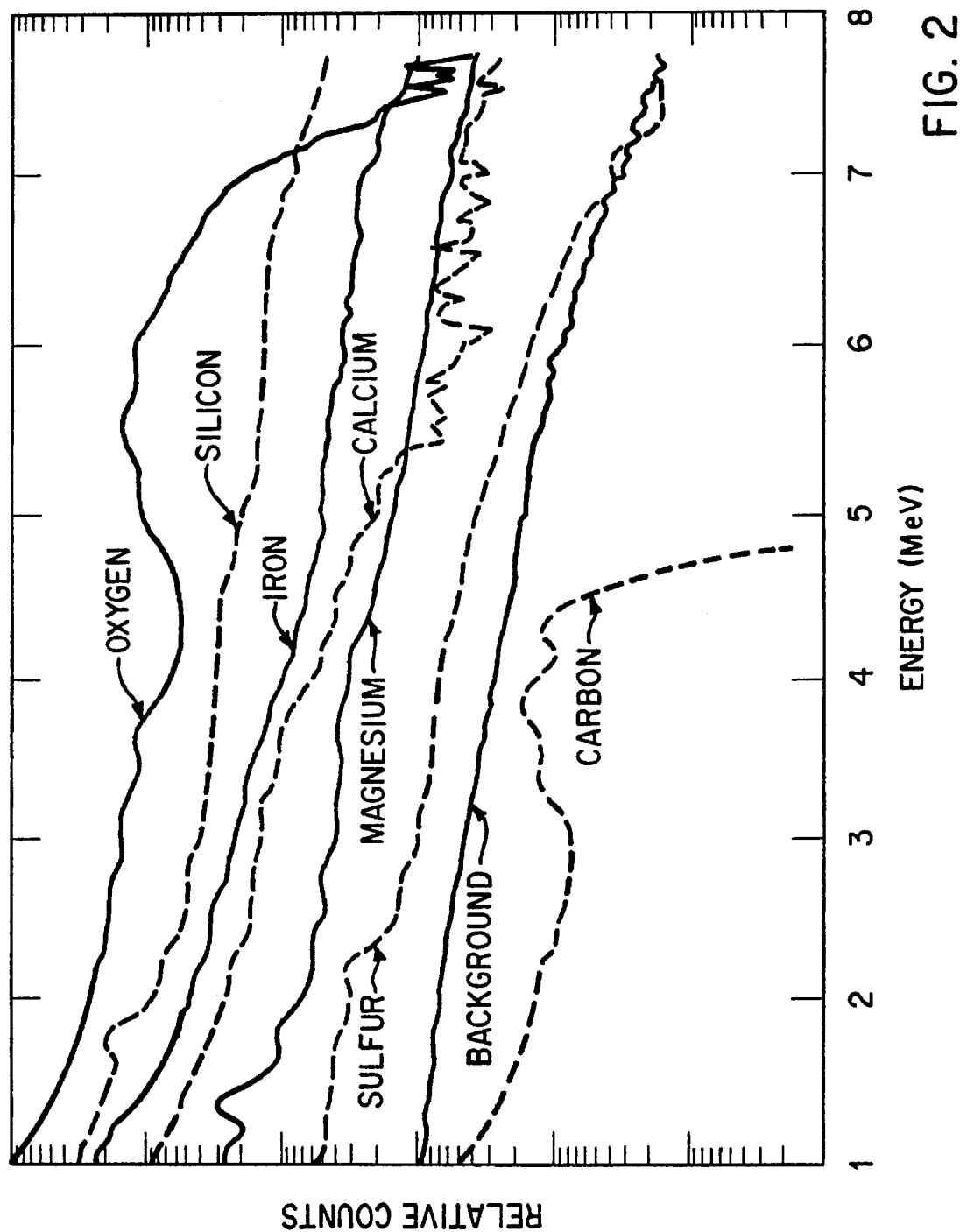
FIG. 2 shows a plot of elemental and background gamma ray spectra.

In use, the neutron generator is pulsed to provide bursts of high energy (14 MeV) neutrons which irradiate the formation adjacent to the tool. The neutrons interact with nuclei in the formation by way of elastic scattering, inelastic scattering and neutron absorption so as to lose energy and produce populations of high energy, epithermal and thermal neutrons and to produce inelastic or capture gamma rays a portion of which pass into the borehole where they can be detected. In the tool described above, the scintillators respond primarily to gamma rays and the detectors provide an output comprising a spectrum of gamma rays of different energies at various times after the neutron burst depending on the process producing the gamma rays in question. By analysing the energy spectrum of the detected gamma rays, the sources can be determined and the nature of the formation derived. Some of the gamma rays detected will be due to interactions between neutrons from the formation and the material of the detector. While it is possible, and desirable, to shield the detector with a material such as boron which absorbs thermal neutrons, shielding against epithermal and high energy neutrons while allowing passage of gamma rays is more difficult. The high energy and epithermal neutrons interact with the material making up the detector by way of inelastic scattering and produce gamma rays which are detected by the scintillator. These gamma rays are known as inelastic tool background and must be accounted for in the detected gamma ray spectrum for the formation contribution to be determined. The gamma ray spectrum can be analysed by comparison with a library of standard elemental spectra. The standard elemental spectra are obtained by calibration measurements or by modelling of the tool response for each detectable element in the formation and will also include an inelastic tool background spectrum for the tool in question which is also obtained by calibration or modeling. In effect the inelastic tool background is treated as a pseudoelemental response which can be included in the analysis. Computer analysis allows the determination of the linear combination of the standard spectra including inelastic tool background which best fits the measured spectrum. An example of such a combination is shown in FIG. 2. The general manner in which the response of a tool is analysed is described in D. V. Ellis, "Pulsed Neutron Spectroscopy", *Well Logging for Earth Scientists*, Elsevier 1987, 293–301 and in U.S. Pat. No. 5,440,158.

Figure 3:
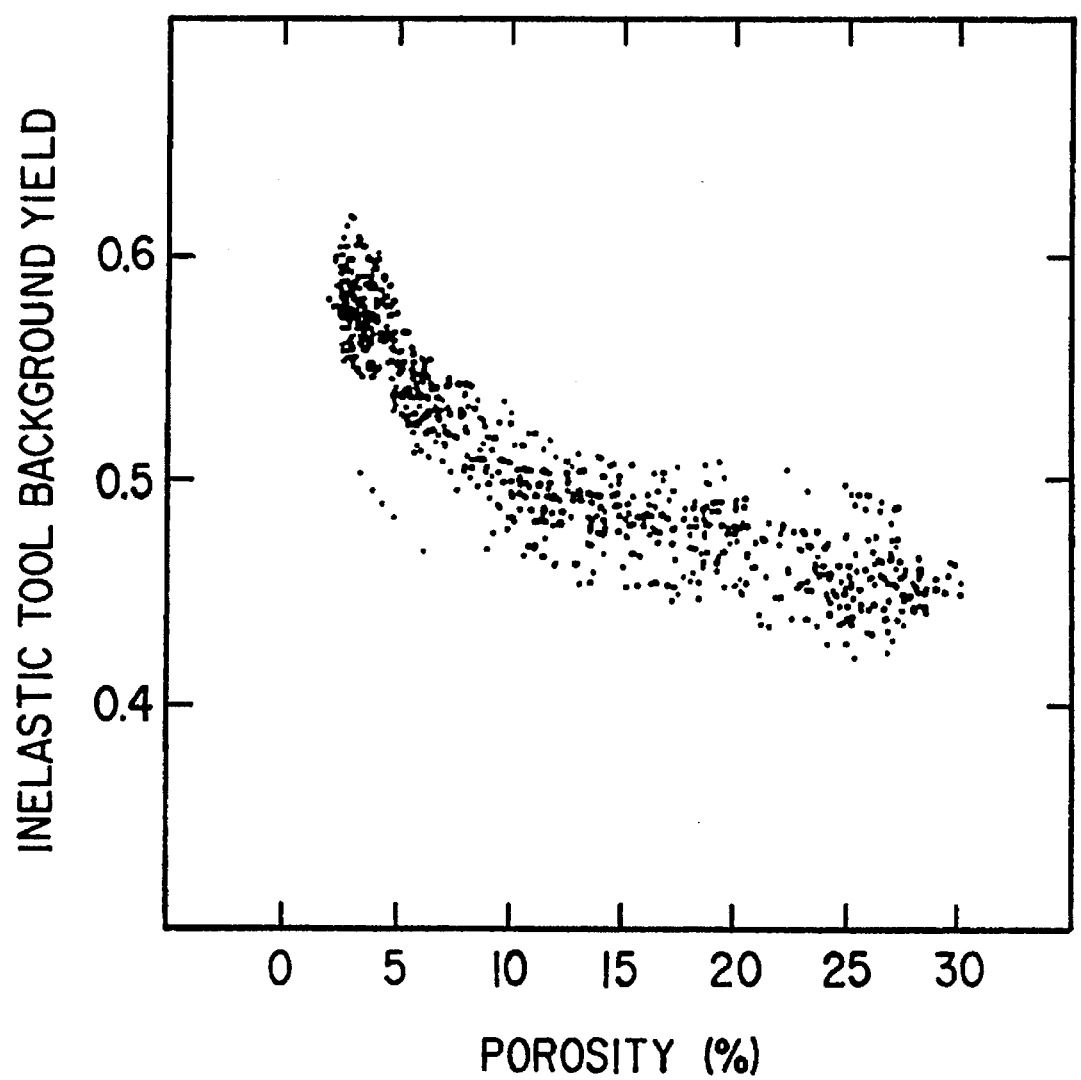
FIG. 3 shows a plot of inelastic tool background vs. formation porosity.

Previously, the inelastic tool background was just seen as interference with the desired measurement and once determined was discarded. In the present invention, the background is analysed since it is now recognized that measurement of the tool background contains information concerning the formation. This is because the number of high energy and epithermal neutrons passing from the formation into the borehole is dependent on the properties of the formation, particularly the porosity of the formation. Thus in its broadest sense, the invention comprises analysis of the tool background to determine the porosity of the formation. It is known that inelastic tool background is dependent on borehole size and casing size and weight. However, as can be seen from FIG. 3, there is also a dependence on formation porosity. Thus by including in the analysis of the tool response, a model which relates the inelastic tool background to the porosity of the formation, the porosity of the formation can be estimated. The model can be obtained by calibration, modelling or both and must also include the effect of borehole size to interpret the background measurement. It is to be noted that the type of scintillator used will affect the background as will the actual design of the tool used.

Since it is desirable to optimize the tool background measurement to improve porosity determination, the detectors can be shielded with a material such as tungsten which serves to increase the number of high energy and epithermal neutron interations in the tool resulting in a higher "background" gamma ray production. The reason for this is that the interaction of high energy neutrons with tungsten nuclei causes more high energy and epithermal neutrons to be produced which in turn leads to more interactions producing gamma rays which are measured as tool background.

By using the present invention, it is possible to obtain a measurement of formation porosity directly from gamma ray measurements without the need to make neutron measurements in the same formation. The use of gamma ray logging to obtain C/O ratio is known, this ratio being used to determine the water saturation Sw of the formation. In order to determine $S_w$, it is necessary to know the formation porosity and previously it has been necessary to make a separate measurement of porosity, typically by means of a neutron porosity measurement. The present invention provides a means to avoid the separate porosity measurement if desired.

We claim:

1. A method of determining porosity in an underground formation surrounding a borehole, comprising:
   a) irradiating the formation with pulses of high energy neutrons from a tool in the borehole;
   b) detecting, in the tool, gamma rays produced by the high energy neutrons;
   c) discriminating between gamma rays resulting from interaction of the neutrons with elements in the formation and gamma rays resulting from interaction of neutrons with material from which the tool is formed; and
   d) determining the porosity of the formation from measurement of the gamma rays resulting from the interaction of neutrons with the material from which the tool is formed.

2. A method according to claim 1, further comprising determining the concentrations of elements in the formation from measurement of gamma rays resulting from the interaction of neutrons with the elements in the formation.

3. A method according to claim 1, further comprising determining the size of the borehole and using this in the determination of the porosity of the formation.

4. A method according to claim 1, further comprising determining the thickness of any casing present in the borehole and using this in the determination of the porosity of the formation.

5. A method according to claim 1, further comprising generating the pulses of high energy neutrons at a first location in the tool and detecting gamma rays at a second location in the tool while minimizing passage of neutrons directly from the first location to the second location through the tool.

6. A method according to claim 1, further comprising including in the tool a material which increases the number of neutrons interacting with the tool so as to produce gamma rays.

7. Apparatus for logging an underground formation surrounding a borehole, comprising:
   a) a tool positionable in the borehole;
   b) means, in the tool, for generating pulses of high energy neutrons for irradiating the formation;
   c) a gamma ray detector in the tool;
   d) means for discriminating between detected gamma rays resulting from interaction of the neutrons with elements in the formation and detected gamma rays resulting from interaction of neutrons with material from which the tool is formed; and
   e) means for determining the porosity of the formation from measurement of the gamma rays resulting from the interaction of neutrons with the material from which the tool is formed.

8. Apparatus according to claim 7, wherein the means for generating pulses of high energy neutrons for irradiating the formation comprises a pulsed DT accelerator source.

9. Apparatus according to claim 7, wherein the gamma ray detector is shielded to minimize passage of neutrons directly from the source to the detector.

10. Apparatus according to claim 7, wherein the detector is surrounded by material to increase the number of high energy and epithermal neutron interactions within the tool.

11. Apparatus according to claim 7, wherein the gamma ray detector comprises a scintillator and an associated photomultiplier.

12. A method of determining porosity in an underground formation surrounding a borehole, comprising:
   a) irradiating the formation with pulses of high energy neutrons from a tool in the borehole;
   b) detecting, in the tool, gamma rays resulting from interaction of the neutrons with elements in the formation;
   c) detecting, in the tool, gamma rays resulting from interaction of neutrons with material from which the tool is formed; and
   d) determining the porosity of the formation from measurement of the gamma rays resulting from the interaction of neutrons with the material from which the tool is formed.

13. A method according to claim 12, wherein the steps of detecting gamma rays resulting from interaction of the neutrons with elements in the formation and detecting gamma rays resulting from interaction of neutrons with material from which the tool is formed comprises detecting substantially all gamma rays incident on a detector to produce a gamma ray spectrum and analysing the spectrum to discriminate between gamma rays resulting from interaction of the neutrons with elements in the formation and detecting gamma rays resulting from interaction of neutrons with material from which the tool is formed.

14. A method according to claim 13, wherein the step of analysing the spectrum also includes determining which elements in the formation have caused gamma rays to be produced.

15. A method according to claim 14, wherein the step of determining the elements also includes determining the concentration of the elements in the formation.

16. A method according to claim 13, wherein the step of analysing the spectrum comprises determining a background of gamma rays due to inelastic interactions of neutrons with the tool.

17. A method according to claim 16, wherein the step of determining the porosity of the formation includes determining the effect of differing formation porosities on the tool background prior to making measurements in the borehole and using the determined effect to analyse the tool background to determine formation porosity.

18. A method according to claim 12, further comprising determining C/O ratio from measurement of gamma rays resulting from interaction of the neutrons with elements in the formation and using the C/O ratio and the porosity to determine the water saturation of the formation.

\* \* \* \* \*